BARE-WIRE MULTIPLE ARRANGEMENT FOR CROSSBAR SWITCHES

Filed March 26, 1963 4 Sheets-Sheet 1

INVENTORS:
J. BERNUTZ - P. JORDAN

BY Phillip A. Weiss
ATTORNEY

INVENTORS:
J. BERNUTZ -P. JORDAN

BY Philip A. Weiss
ATTORNEY

June 8, 1965 J. BERNUTZ ETAL 3,188,436

BARE-WIRE MULTIPLE ARRANGEMENT FOR CROSSBAR SWITCHES

Filed March 26, 1963 4 Sheets-Sheet 3

INVENTORS:
J. BERNUTZ - P. JORDAN

BY Phillip A. Weiss
ATTORNEY

INVENTORS:
J. BERNUTZ - P. JORDAN.

BY Phillip A. Weiss
ATTORNEY

United States Patent Office 3,188,436
Patented June 8, 1965

3,188,436

BARE-WIRE MULTIPLE ARRANGEMENT FOR CROSSBAR SWITCHES

Johannes Bernutz, Ludwigsburg-Hohenecke, and Peter Jordan, Feilnbach am Wendelstein, Germany, assignors to International Standard Electric Corporation, New York, N.Y., a corporation of Delaware Filed Mar. 26, 1963, Ser. No. 270,785
Claims priority, application Germany, Apr. 3, 1962, St 19,040
6 Claims. (Cl. 200—166)

The invention refers to crossbar switches with wire-spring contacts and more particularly, to bare-wire multiples for crossbar switches.

The practice of equipping crossbar switches with wire springs in place of leaf springs is known to the art. As compared with the leaf-spring design, also known to the art, the advantage of wire-spring construction is to be found in its lower production cost and in the fact that it takes up less space, thereby increasing contact capacity within the same area to almost twice that of a crossbar-switch design using leaf springs. This advantage of the crossbar-switch design with wire springs, however, is largely offset because with wire springs only a ribbon multiple but no bare-wire multiple can be used, since there is no simple way to attach the bare-wire terminals to the wire-spring tips and still ensure contact. Ribbon cable is used since it can be easily soldered to the wire-spring tips. Ribbon cable, however, is so expensive that the lower production costs of the wire-spring design for crossbar switches are more than negated.

Therefore, an object of this invention is to provide a new and economical bare-wire multiple for crossbar switches with wire-spring contacts.

Another object of this invention is to provide a bare wire multiple using a notched insulating part that holds and separates the wire spring in position for facilitating soldering them to bare wire multiples held in recesses in the insulating part.

A further object of this invention is to provide a notched insulating part for holding the wire springs wherein the notches are fanned out.

A still further object is to provide a notched insulating part arranged to accommodate crossbar switches with end positioned spring plates.

A primary object of the invention, therefore, is to improve the design of the wire-spring crossbar switch and thus make it possible to use a bare-wire multiple to connect the wire-spring tips.

In accordance with one aspect of this invention, the wires of a wire-spring pair, are twisted together, spread apart at their tips, and a grooved and notched insulating part is slipped onto the twisted wire springs staggered in depth. The said part is shaped to match the stagger of the wire springs and is held in place by the wire springs in the grooves and by the bare wires to be soldered to the spread tips of the wire-springs bent at right angles. The bare wires rest in the notches of a comb-like lateral edge of the insulating part and aid in its support. The advantages that can be obtained with this type of construction are to be found in the substantial reduction in cost of the crossbar switch resulting from the use of the inexpensive bare-wire multiple. Furthermore, such a multiple can be cut and connections can be made to the outside at suitable points.

In another embodiment of the invention, the notches in the insulating part are arranged in the shape of a fan, in which case the spring tips are spread apart and are thereby more accessible and the insulating part is held tightly by the tension of the spring tips. In order to tighten this hold even more, a further development of the invention provides for the wire-spring tips behind the insulating part to be bent back toward that part to lend it support.

In crossbar switches whose end-positioned spring plates have two wire-spring pairs lying one over the other, while the middle-positioned spring plates contain only one wire-spring pair, a further embodiment of the invention provides the insulating parts with two adjacent notches for each of the wire-spring pairs in the end-positioned spring plates and brings the upper end-positioned spring-wire pairs to the level of the middle-positioned spring-wire pairs by means of a twofold right-angle bend.

The above mentioned and other features and objects of this invention and the manner of obtaining them will become more apparent and the invention itself will be best understood by reference to the following description of an embodiment of the invention taken in conjunction with the accompanying drawing in which:

FIG. 1 shows a side view of the arragement of the spring plates and the bare-wire multiple.

FIG. *1a* shows a plan view of the view of the spring plates and bare wire multiples.

Figure 1:
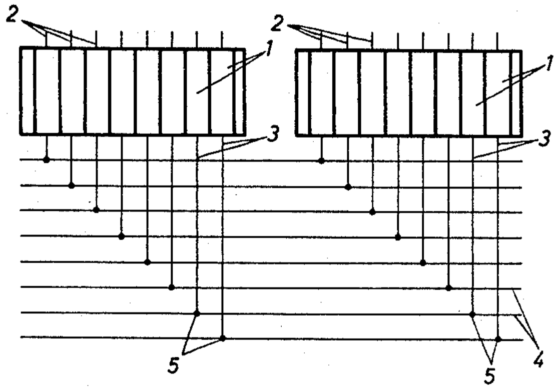
Figure 1A:
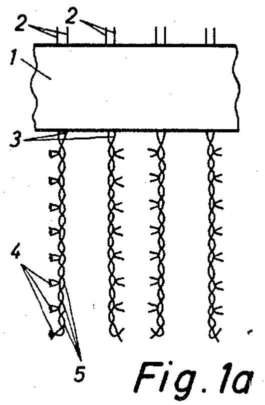

Referring to the drawings, FIG. 1 shows a plan view and a side view of a bare-wire multiple according to the invention; there are two groups of eight spring plates 1 each, with double adjacent wire springs 2 shown, whose spring tips 3 of staggered length are so connected to wires 4 of the bare-wire multiple that spring tip points 5, spread and bent at right angles, meet wires 4 of the bare-wire multiple and are soldered to them.

Figure 2:
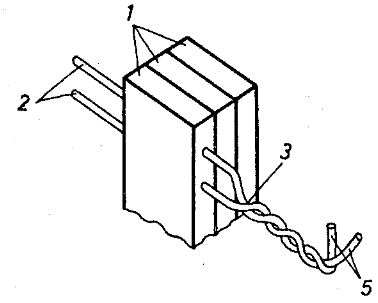
FIG. 2 shows three spring plates in perspective and a wire-spring pair in one of them.

FIG. 2 shows three spring plates 1 in perspective, one of which bears a wire-spring pair 2. The wire pairs embedded in the two other spring plates are not shown, in order to simplify the drawing. Tips 3 of both wires of spring pair 2 are twisted together in known fashion and tip points 5 are spread apart and bent at right angles.

Figure 3:
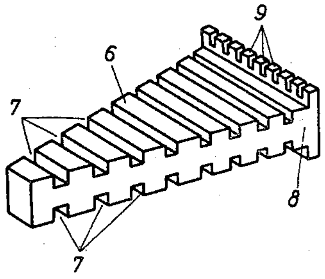
FIG. 3 shows an insulating part in perspective.

FIG. 3 shows an insulating part 6 provided on both sides with notches 7 and having an approximately right-angle triangular design. Side 8 of insulating part 6 with its right-angle triangular design is tapered and is provided on both sides with notches 9.

Figure 4:
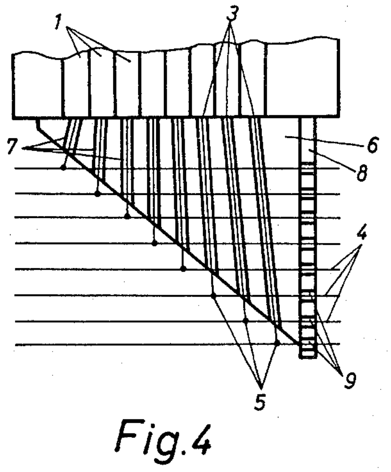
FIG. 4 is a plan view showing the wire-spring tips inserted in the notches.

FIG. 4 shows the arrangement of insulating part 6 in the bare-wire multiple. Wire-spring tips 3 projecting from spring plates 1 rest in notches 7 of insulating part 6, which comes to rest with its side 10 on spring plates 1. Wires 4 of the bare-wire multiple are accommodated in notches 9 of comb-like side 8. With insulating part 6 shaped as shown in FIG. 4, notches 7 fan out, in order to spread soldering points 5 farther apart and thereby make them more accessible.

Figure 5:
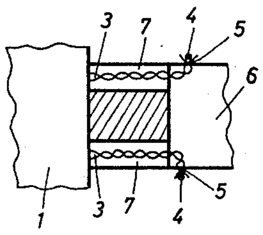
FIGS. 5 and 6 show two spring tips projecting from a spring plate and their arrangement on the insulating part.
Figure 6:
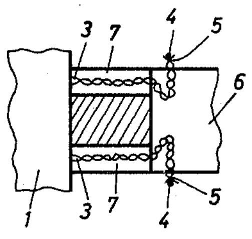

FIGS. 5 and 6 show how insulating part 6 accommodates wire tips 3 of the wire springs in its notches 7 and how it is held by bare wires 4; FIG. 6 shows how insulating part 6 can be held by appropriately bending wire tips 3 so that they help support insulating part 6.

Figure 7:
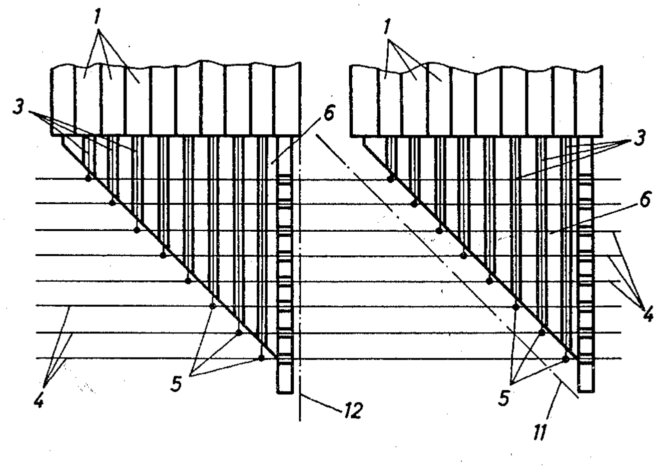
FIG. 7 shows an incision in a bare-wire multiple according to the invention.

FIG. 7 shows how the bare-wire multiple of wires 4 can be tapped at whatever point required. The taps can be led along separating lines 11 and 12.

Figure 8:
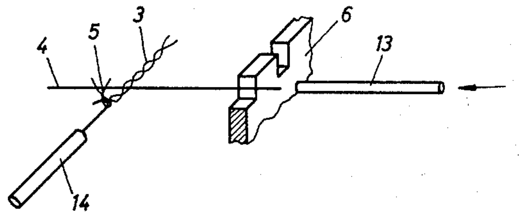
FIG. 8 shows the arrangement of a connection wire being led out from such a tap.

The remaining portions of cut bare wires 4 can be covered with insulating sleeves 13, as shown in FIG. 8. A connection wire 14 coming from without can be soldered on at the bending point of wire spring tip 3.

Figures 9, 10, 11:
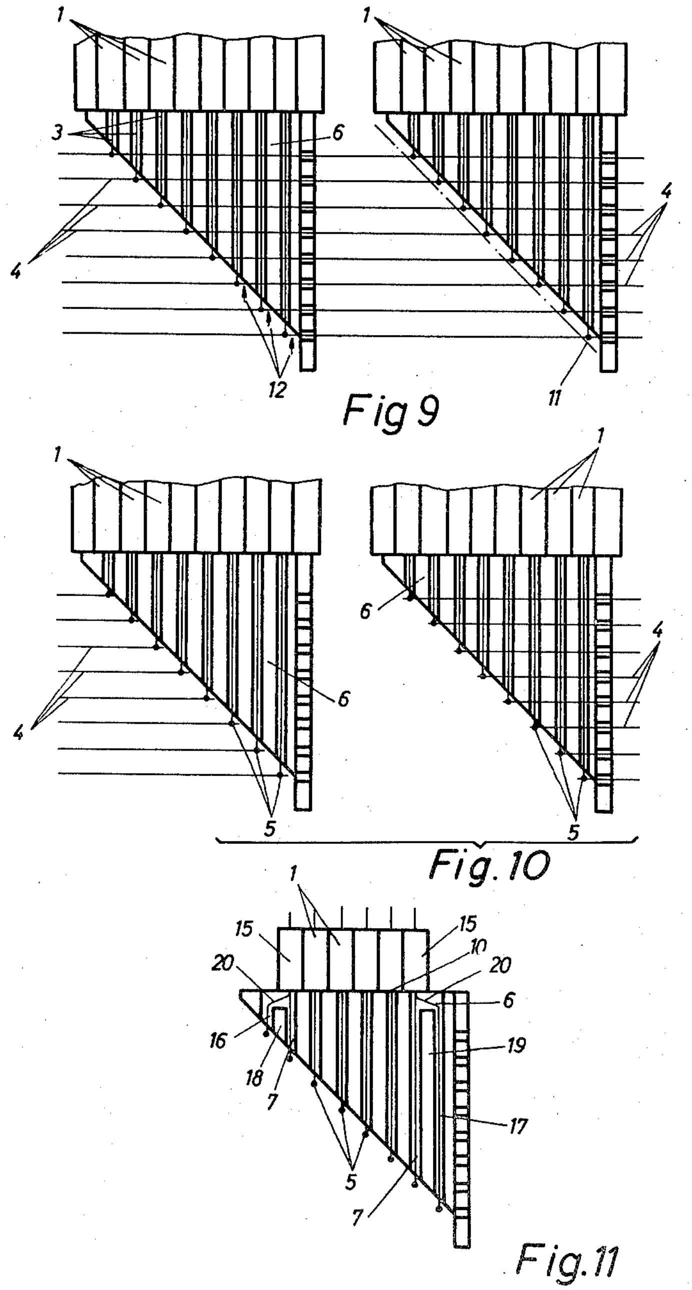
FIGS. 9 and 10 show a tap in the bare-wire multiple according to the invention in another type of embodiment, FIG. 9 before the tap is made FIG. 10 thereafter.
FIG. 11 is a plan view of an insulating part for a crossbar switch with six spring plates in a group with end-positioned spring plates having two wire-spring pairs lying one over the other.

However, a bare-wire multiple can also be tapped as shown in FIG. 9. In this case, the tapping is done, as in the case of the tapping according to FIG. 7, along separating line 11, but bare wires 4 are nipped off at separating points 12, as shown in FIG. 10, which shows the condition after the multiple has been tapped. With this type of tapping of a multiple it is unnecessary to cover the remaining portions of multiple wires 4 with insulation sleeves, as is required in the type of tapping according to FIG. 7.

Figure 12:
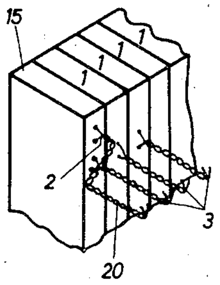
FIG. 12 shows the arrangement of the wire-spring tips according to FIG. 11 in perspective.

Another way to simplify the design is to have end-positioned spring plates 15 in the individual spring-plate groups, as shown in FIG. 11, accommodate two wire-spring pairs one over the other, instead of only one pair, as is the case with middle positioned spring plates 1. Insulating part 6 is designed with six middle positioned notches 7 and two end-positioned notches 16 and 17, in which the wire-spring pairs not arranged at the level of the spring pairs of middle positioned spring plates 1 and belonging to the end-positioned spring plates 15 are accommodated. To that end, end-positioned separating ribs 18, 19 on insulating part 6 are not brought out to its side 10 but are broken off beforehand, as FIG. 11 shows, so that the end-positioned wire-spring pairs 20, as the perspective in FIG. 12 shows, can be brought to the level of the other spring tips 3 by a twofold right-angle bending and inserted in notches 16, 17 in accordance with FIG. 11.

Figure 13:
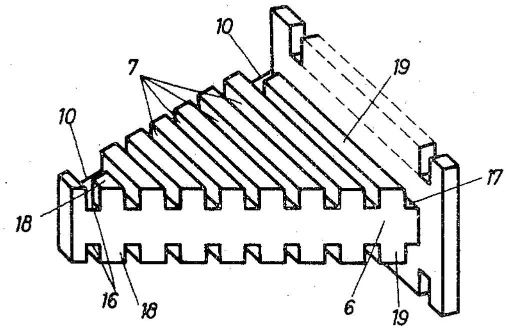
FIG. 13 shows an insulating part according to FIG. 11, also in perspective.

FIG. 13 contains an insulating part 6 according to FIG. 11 drawn in perspective, which shows that end-positioned ribs 18 and 19 are not brought out to edge of side 10 but end before reaching it, in which case wire tips 20 of the wire-spring pairs embedded in the end-positioned spring plates 15 can be inserted in notches 16, 17 of insulating part 6 according to FIG. 11.

While the principles of the invention have been described above in connection with specific apparatus, it is to be understood that this descrition is made only by way of example and not as a limitation on the scope of the invention.

We claim:

1. A bare-wire multiple for crossbar switches with wire-spring contacts comprising spring plates holding wire-springs of said wire-spring contacts, insulating means juxtaposed to said spring plates having grooves receiving individual terminal tips of said wire-spring contacts, a series of notches substantially normal to said grooves in said insulating means receiving said bare wires and said notches each positioned at a different distance from said juxtaposed spring plate causing individual ones of said bare wires to traverse said grooves at different distances from said spring plates whereby each of said tips can readily be soldered to selective ones of said bare wires.

2. A bare-wire multiple for crossbar switches with wire-spring contacts, said wire-spring contacts comprising a pair of wires, each of said wires having a terminal tip and a contact tip, a plurality of abutting spring plates, said wire-spring contacts mounted in said spring plates with the terminal tips of each pair of said wire-spring contacts protruding from one side of said spring plate, said terminal tips of each pair of wires twisted together and having successively shorter lengths, insulating means abutting the tip side of said spring plates having a plurality of transverse grooves, said transverse grooves serving to hold individual ones of said twisted wire pairs, said grooves having successively shorter lengths whereby each of said twisted pairs is slightly longer than the groove with which said twisted pair is associated, and a series of notches at one end of said insulating means, bare wires of said bare wire multiple mounted in said notches to traverse said twisted pairs at different distances from said spring plates whereby each of said twisted pairs can readily be soldered to selective ones of said bare wires where said twisted pair extends beyond said insulating means.

3. A bare-wire multiple according to claim 2 wherein the ends of said twisted pairs are spread apart and bent at right angles.

4. A bare-wire multiple according to claim 3 wherein said grooves fan out from said spring plates.

5. A bare-wire multiple according to claim 4 wherein said twisted pairs are bent toward the said insulating means to aid in supporting said insulating means.

6. A bare-wire multiple according to claim 5 wherein said plurality of spring plates comprises end-positioned spring plates having two wire-spring pairs, one of said pairs positioned above the other of said pairs, said insulating means comprises adjacent grooves for the wire-spring pairs in the end positioned spring plates, and said upper end positioned wire-spring pair having a twofold right-angle bend to bring it to the level of the other of said pairs.

References Cited by the Examiner

FOREIGN PATENTS 235,157 8/61 Australia.

BERNARD A. GILHEANY, *Primary Examiner.*